United States Patent [19] [11] 4,194,615
Tell et al. [45] Mar. 25, 1980

[54] APPARATUS FOR UNLOADING LOOSE PARTICULATE SOLID MATERIAL

[75] Inventors: Karl G. Tell, Helsingborg; Arne E. Wall, Landskrona; Olle L. Siwersson, Helsingborg, all of Sweden

[73] Assignee: AB Scaniainventor, Helsingborg, Sweden

[21] Appl. No.: 936,953

[22] Filed: Aug. 25, 1978

Related U.S. Application Data

[63] Continuation-in-part of Ser. No. 749,991, Dec. 13, 1976, abandoned.

[30] Foreign Application Priority Data

Dec. 17, 1975 [SE] Sweden .............................. 7514248

[51] Int. Cl.² .................... B65G 43/08; B65G 47/19
[52] U.S. Cl. ........................... 198/502; 198/508; 198/524; 198/548; 198/670; 198/856; 414/291; 414/295
[58] Field of Search .............. 198/312, 313, 502, 507, 198/508, 524, 548, 558, 560, 572, 573, 589, 594, 670, 657, 661, 671, 855, 856, 857; 193/30, 3; 414/139, 140, 291, 295

[56] References Cited

U.S. PATENT DOCUMENTS

| | | | |
|---|---|---|---|
| 1,852,385 | 4/1932 | Weigert | 198/524 |
| 2,354,647 | 8/1944 | Blusson | 198/524 |
| 2,475,404 | 7/1949 | Reed | 198/558 X |
| 2,800,991 | 7/1957 | Manierre | 198/524 |
| 2,966,253 | 12/1960 | Gerrans | 198/572 |
| 3,184,109 | 5/1965 | Brackett | 198/502 X |
| 3,298,543 | 1/1967 | Laidig | 198/657 X |
| 3,444,987 | 5/1969 | Palmer | 198/313 X |
| 3,578,146 | 5/1971 | Mehlschan | 198/524 |
| 3,858,733 | 1/1975 | Morioka et al. | 414/291 |
| 3,889,796 | 6/1975 | Baily et al. | 198/502 X |
| 4,020,953 | 5/1977 | Eklöf et al. | 198/589 X |

FOREIGN PATENT DOCUMENTS

| | | | |
|---|---|---|---|
| 1290875 | 3/1969 | Fed. Rep. of Germany | 193/30 |
| 2418630 | 4/1974 | Fed. Rep. of Germany | 198/502 |
| 364529 | 2/1973 | U.S.S.R. | 198/524 |

Primary Examiner—James L. Rowland
Attorney, Agent, or Firm—Karl W. Flocks

[57] ABSTRACT

An apparatus for unloading loose particulate solid material having a discharge pipe and a positive discharge device at the outlet end of the discharge pipe. A pressure sensor is arranged to sense the pressure of the material at the outlet end of the positive discharge device and to produce an output signal in response thereto. A positioning device for varying the position of the outlet of positive discharge device is provided and is driven in response to the output signal of the pressure sensor.

10 Claims, 6 Drawing Figures

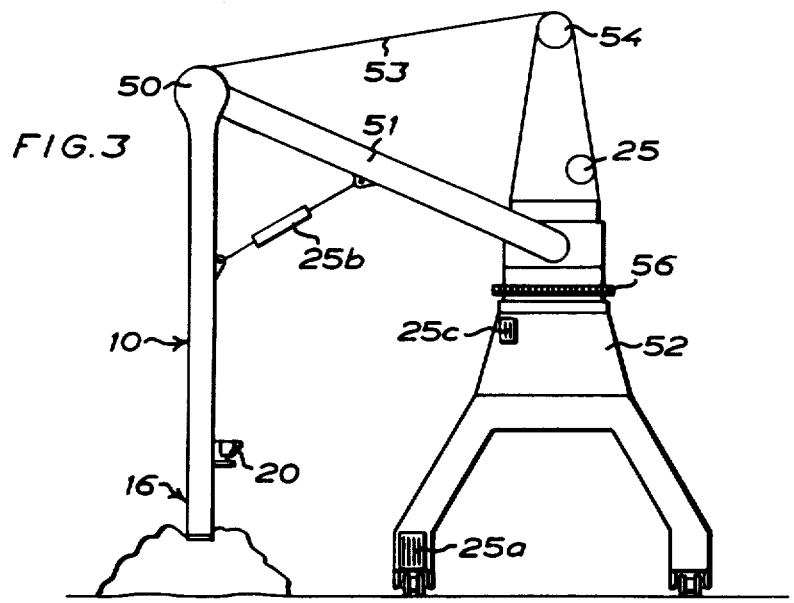
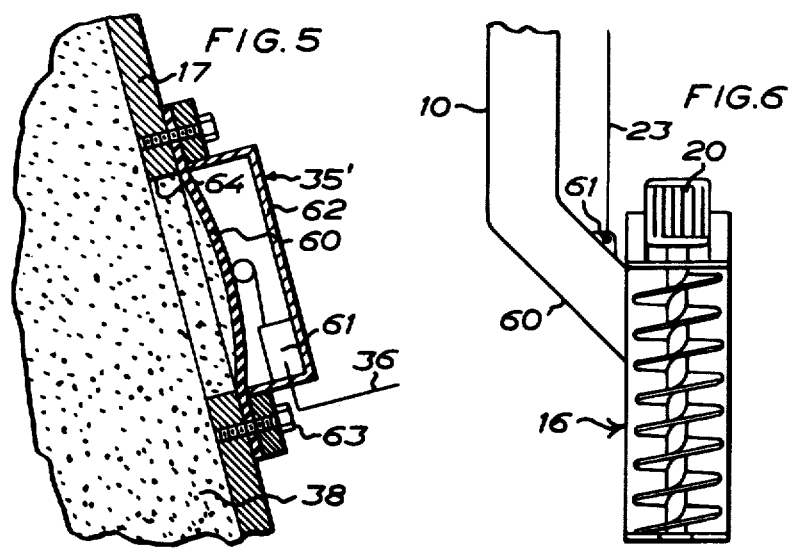

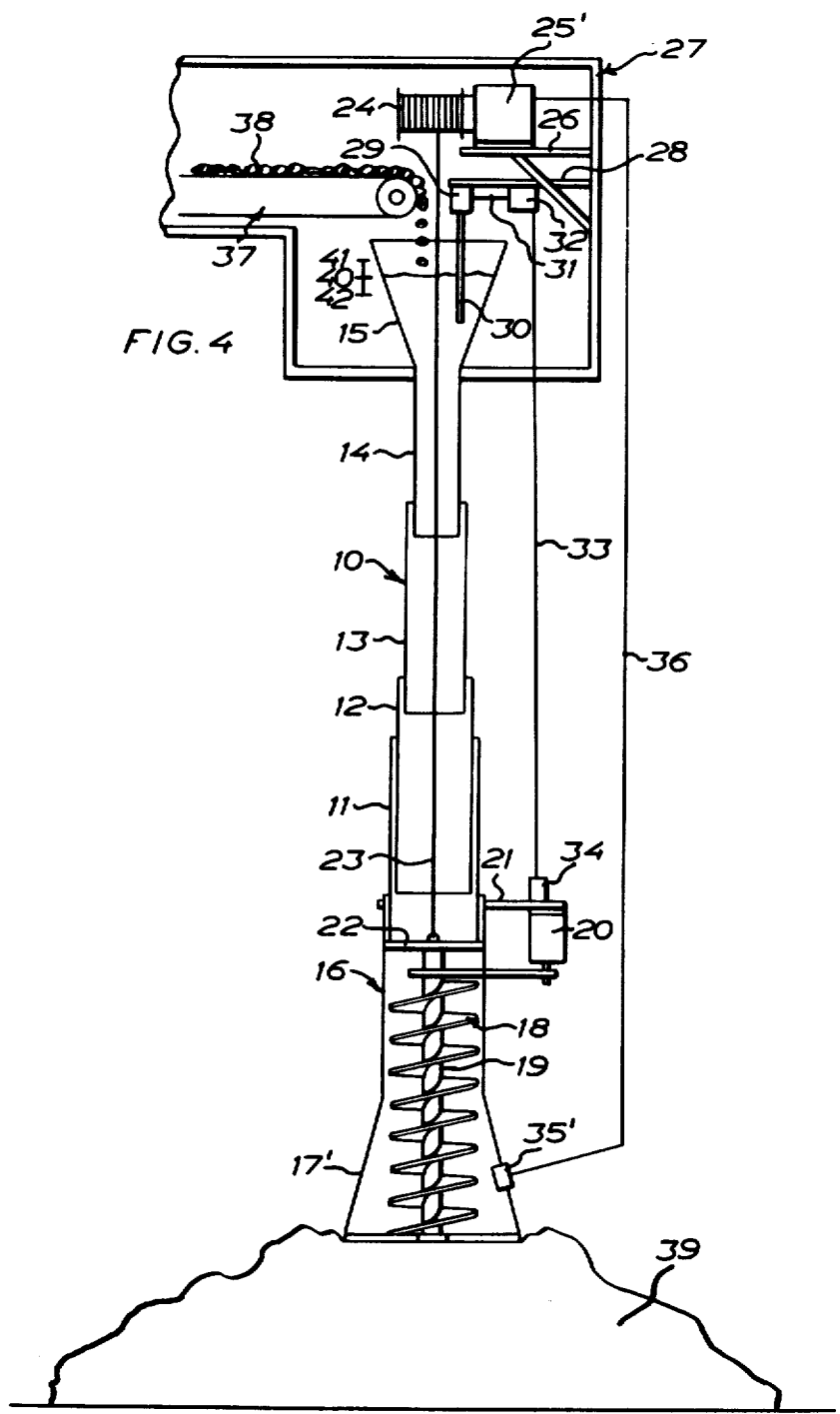

APPARATUS FOR UNLOADING LOOSE PARTICULATE SOLID MATERIAL

This application is a continuation-in-part of application Ser. No. 749,991, filed Dec. 13, 1976, now abandoned.

This invention relates to an apparatus for continuous unloading of loose particulate solid material, comprising a discharge pipe having an outlet end the position of which is variable in vertical and/or lateral sense by means of a positioning device.

On unloading loose particulate solid material, such as coal, ores, stones, etc., one usually encounters great difficulties as the material generates clouds of dust, and one has sometimes tried to solve these problems with the aid of telescoping discharge pipes through which the loose particulate material is conducted from, e.g., the discharge end of a conveyer belt to a supply located below said end. The telescoping discharge pipe is usually shortened according as the height of the supply increases. Problems may be encountered with this type of unloading apparatus, especially if the amount of material fed per unit of time to the upper inflow end of the discharge pipe varies and especially if it is not possible or desired for some reason to stop the feed device, for instance a conveyer belt, or lower the speed thereof. It has therefore been necessary to give the discharge pipe excessive dimensions so that it can receive the largest amount of material calculated per unit of time. In normal operation the discharge pipe will, therefore, be only incompletely filled with particulate material, which sometimes results in an increased dust formation at the discharge end. Dust formation at the discharge end may also arise if the inflow end of the discharge pipe should be full, namely in the event that the particulate material in the lower part of the discharge pipe moves downwards in free fall and thus by its acceleration sucks air into the discharge pipe.

It is endeavored by the present invention to considerably diminish the dust formation and in certain cases also to reduce the dimensions of the discharge pipe by providing at the outlet end of the discharge pipe a positive discharge device which positively discharges the material from the lower end of the discharge pipe and forces out the material below the surface level of the supply so that the material already in the supply will serve as a "dust trap." It is advantageous simultaneously to see to it that the discharge pipe in normal operation is constantly kept filled with the discharged particulate material up to a certain desired level.

One object of the present invention, thus, is to diminish the dust formation problems in prior art apparatuses by utilizing a positive discharge device.

Another object of the invention is to make it possible to reduce the dimensions of the discharge pipe by the use of a positive discharge device of controllable discharge speed.

Still another object of the invention is to further diminish the dust formation by seeing to it that the discharge pipe in normal operation is constantly kept filled with the discharged particulate material up to a certain desired level.

These and further objects of the invention, which will appear from the following, are attained by means of an apparatus for unloading loose particulate solid material, comprising a discharge pipe having an outlet end the position of which is variable in vertical and/or lateral sense by means of a positioning device. According to the invention, a motor driven positive discharge device is disposed at the outlet end of the discharge pipe and a pressure sensing means is arranged to sense the pressure of the material at the outlet end of the positive discharge device and adapted, in dependence on said pressure, to regulate the drive motor of the positioning device for raising, lowering and/or laterally displacing said outlet end. By so sensing the pressure at the outlet end the drive motor of the positioning device can be controlled and caused to change the position of the outlet end to keep the pressure of the positive discharge device on the supply of material relatively constant and thereby ensure that the particulate material is forced out below the surface level of the supply in order that the material already in the supply shall serve as a "dust trap."

According to the invention, it is particularly advantageous if the positive discharge device is a screw conveyer. This will make it easy to regulate the discharge speed by regulation of the speed of rotation of the screw conveyer.

The pressure sensing means adapted to sense the pressure of the material at the outlet end of the positive discharge device may be a load sensing device according to Swedish Pat. No. 366 178 or Swedish Printed Patent Application No. 7506483-2 (Publication No. 390,589) said device being adapted to sense the load of the motor of the positive discharge device, since said load is a measure of the pressure of the material, that is to say, a high pressure of material and, as a consequence, a high resistance to the discharge gives a high load on the motor of the positive discharge device, and vice versa. The pressure sensing means can also be provided in the positive discharge device in the vicinity of the end thereof and be a diaphragm mounted in the wall of the discharge device and a microswitch disposed outside said diaphragm and conected in the control circuit for the motor of the positioning device.

In a further development of the invention a level sensing means is preferably mounted in the inflow end of the discharge pipe for sensing the level of material in said end pipe, said level sensing means being connected to a control circuit for controlling the level of material in the discharge pipe. Such a level sensing means may preferably be a capacitive transmitter, that is, a transmitter the capacitance of which is influenced by the surrounding material and is related to how long an extension of the transmitter is surrounded by the material. However, the level sensing means can also be of the type having a rotary shaft penetrating into the material and being rotated at a constant speed by a short circuited AC-motor, the motor load of which is sensed by a load sensing device according to Swedish Pat. No. 366 178 or Swedish Printed Patent Application No. 7506483-2 (Publication No. 390,589), the motor load sensed by the load sensing device being a measure of how large a part of the rotary shaft is surrounded by the particulate material and is exposed to friction against said material. Irrespectively of whether the level sensing means is of the capacitive type or of the friction measuring type, the level sensing means has a transmitter section for transmitting a control signal to the control circuit controlling the level of material in the inflow end of the discharge pipe. Said control circuit preferably controls the motor of the positive discharge device and then contains a thyristor rectifier controlling said motor, in which case the motor is designed as a DC-motor of variable speed.

However, the level sensing means at the inflow end of the discharge pipe in a preferred embodiment of the invention can also be used for controlling a feed device serving to supply the particulate material to the inflow end of the discharge pipe to control the feed rate of said device in dependence on the level of material in the inflow end of the discharge pipe. Such a level sensing means can also be utilized as an overfill protection device which prevents overfilling of the discharge pipe with material.

If the length of the discharge pipe between the inflow and outflow ends of the discharge pipe is variable, that is, if the discharge pipe is of telescoping or bellows-like construction, the positioning device is preferably designed as a hoist or elevating means.

According to an advantageous embodiment of the invention, it is suitable, if the discharge pipe is of constant length, for said discharge pipe to be pivotally connected to a feed conveyer for feeding the particulate material to the inflow end of the discharge pipe, said discharge pipe and said feed conveyer being pivotally interconnected in form of a raisable and lowerable and possibly, also, swingable system similar to a crane arm.

Further objects of the invention and the advantages gained thereby will appear from the following description, reference being made to the accompanying drawings in which FIG. 1 schematically shows an embodiment of an unloading apparatus according to the invention, in which only the lower end of the discharge pipe is shown;

FIG. 2 schematically shows a section on line II—II in FIG. 1;

FIG. 3 shows another embodiment of the invention in which the discharge pipe is united with a feed conveyer to form a system similar to a crane arm;

FIG. 4 shows still another embodiment of the invention in which the discharge pipe is of telescoping design;

FIG. 5 schematically shows a detail and a pressure sensing means for sensing the pressure of the material;

FIG. 6 schematically shows a further embodiment of the invention and a preferred way of arranging the motor of the positive discharge device.

Figure 2:
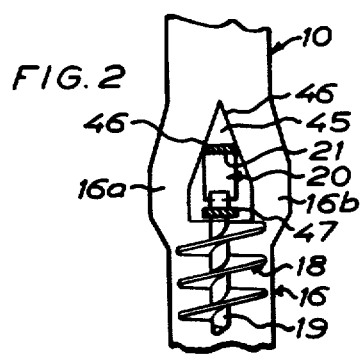

The unloading apparatus according to the present invention comprises a discharge pipe 10. The discharge pipe has at the lower end a positive discharge device 16 with an outlet end 17. The discharge device 16 has an inner conveyer screw 18 the shaft 19 of which is mounted in a suitable manner. Said conveyer screw 18 is driven by a drive motor 20 which is secured to a bracket 21 on the discharge device 16. As will appear from FIG. 2, the upper position of the discharge device is formed as a "breeches pipe" having breeches 16a, 16b, which divide the flow of material from the discharge pipe into two streams and conduct them on either side of a wedge-shaped space 45 which is defined by the inner walls 46 of the breeches 16a, 16b. The motor 20 secured to the bracket 21 is drivably connected to the shaft 19 of the conveyer screw by a V-belt and pulley arrangement 47.

The motor 20 has a load sensing means 35 which is adapted to sense the load of the motor and which preferably is designed in conformity with that stated in Swedish Pat. No. 366 178 or Swedish Printed Patent Application No. 7506483-2 (Publication No. 390,589). The load of the motor of the positive discharge device in fact is a measure of the pressure of the material at the outlet end 17 of the positive discharge device, that is to say, a high pressure of material and, as a consequence, a high resistance to the discharge gives a high load on the motor of the positive discharge device, and vice versa. The load sensing means 35 is connected via a conductor 36 to a motor 25, 25a, 25b, 25c, which is adapted to alter the vertical or lateral position of the outlet end 17 of the positive discharge device.

The unloading apparatus according to the invention functions in the following manner. When the apparatus is started and the discharge pipe 10 is empty the feed of the material is initiated preferably while the positive discharge device 16 is at standstill. When the level of material has risen somewhat in the discharge pipe the positive discharge device is initiated so that the material in the discharge pipe will be positively discharged downwards into a supply 39. Since the material is positively discharged from the discharge pipe 10 the positive discharge device 16 will constantly rest on and exert pressure against the top of the supply 39. In principle, the positive discharge device could of its own accord "climb" the ever increasing supply 39, but said device would thus take up a varying load in dependence of how much material is contained in the discharge pipe 10. As the pressure in the outlet end 17 is sensed by sensing of the load on the motor 20 of the positive discharge device, the motor 25, 25a, 25b, 25c for positioning the outlet end 17 of the device can be so regulated that the pressure of the device against the supply 39 is kept reasonably constant, the particulate material being forced out below the surface level of the supply 39 so that the material in said supply will serve as a "dust trap." Positioning can thus take place by raising or lowering the outlet end 17 in dependence on whether the pressure of the material in the positive discharge device is too high or too low. However, positioning can also be carried out as a lateral displacement so that the outlet end 17 projects over parts of the supply 39 lying at lower levels. Regulation of the positioning motor 25, 25a, 25b, 25c thus takes place in such a manner that the pressure of the material in the outlet end 17 is kept as constant as possible.

FIG. 3 shows how the discharge pipe 10 with its positive discharge device 16 is mounted on a crane structure, the discharge pipe 10 being at its upper inflow end connected via a dust proof transition housing 50 to a feed conveyer 51 which at its opposite end is pivoted to a gantry crane 52. The gantry crane 52 has a hoist motor 25 with a wire rope drum (not shown) for a wire rope 53 which passes over a return pulley 54 and is connected to the transition housing 50. The discharge pipe 10 could be freely swingable with regard to the feed conveyer 51 but, as shown, is preferably connected to said conveyer by a piston and cylinder unit 25b by means of which the angle enclosed between the feed conveyer 51 and the discharge pipe 10 can be regulated. The gantry crane 52 further has a drive motor 25a by means of which the gantry crane can be driven along tracks (not shown). The tower of the gantry crane can be disposed on a turntable assembly 56 for swinging of the entire arm system. The drive motor for this swinging movement has been schematicaly illustrated in FIG. 3 at 25c. In this embodiment the pressure of the material sensed at the outlet end 17 of the positive discharge device 16 can be utilized for controlling any of or any combination of the motors 25, 25a, 25b, 25c.

In FIG. 4 there is shown a further embodiment of the invention in which the discharge pipe 10 comprises various telescoping parts 11-14. Mounted at the upper end of the discharge pipe is an inflow hopper 15 and at the lower end of the discharge pipe a positive discharge device 16 which in this embodiment has an outlet cone 17'. In this embodiment there is provided inside the positive discharge device 16 a transverse beam or a spider 22 which carries a bearing device (not shown) for the conveyer screw 18 and which, besides, serves as an anchorage for a hoist wire rope 23 which extends inside the discharge pipe 10 and is windable onto a wire rope drum 24. The drum 24 is driven by a drive motor 25'. By controlling the drive motor 25' the length of the discharge pipe 10 can thus be increased and reduced, respectively.

The motor 25' is mounted to a brakcet 26 in a frame 27 which is formed as a dust proof housing. A level sensing means 29 is arranged on another bracket 28. Said level sensing means in the illustrated embodiment has a rotary shaft 30 which extends downwards in the inflow hopper 15 and is rotated at constant speed by a short circuited AC-motor, the motor load of which is sensed in conformity with what is stated in Swedish Printed Patent Application No. 7506483-2 (Publication No. 390,589) or Swedish Pat. No. 366 178. The load on the motor is a measure of how large a portion of the shaft 30 is surrounded by the particulate material and exposed to friction against it. Therefore, the load is a measure of the level of the material in the inflow hooper. The level sensing means 29 is connected by a conductor 31 to a transmitter 32 which in turn is connected by a conductor 33 to a thyristor rectifier 34 which is connected into the control circuit of the drive motor 20 of the positive discharge device 16.

In the embodiment now described the pressure sensing means 35' is arranged in the outlet cone 17 of the positive discharge device 16. In this case the pressure sensing device, as will appear from FIG. 5, can comprise a diaphragm 60 provided in the wall of the outlet cone 17 and a microswitch 61 disposed outside said diaphragm and connected by the conductor 36 to the hoist motor 35' to control it, said microswitch being influenced by the pressure of the material in the outlet cone 17. The microswitch is disposed in the interior of an envelope 62 which is screwed by screws 63 to the outlet cone 17 opposite a hole 64 therein.

As will appear from FIG. 4, a conveyer belt 37 terminates above the inflow hopper 15. The particulate material 38 is conveyed on said conveyer belt 37 to the discharge pipe 10. At least the discharge end of the conveyer belt is enclosed in the dust proof housing 27 to reduce dusting and swirling of the material.

The unloading apparatus according to the embodiment shown in FIG. 4 functions in the following manner. When the apparatus is started and the discharge pipe 10 is empty, the feed of the material 38 is initiated, while the positive discharge device 16 is at standstill, the level of the material in the discharge pipe rising until the pipe is finally entirely full. The level of the material in the discharge pipe should be kept at a determined mean level 40, but may be allowed to vary from a maximum at the level 41 to a preferred minimum at the level 42. When the level of the material has risen to the level range 41-42 the sensing shaft 30 of the level sensing means 29 will be partially immersed in the material in the discharge pipe. The level sensing means senses the level of the material and the transmitter 32 of the sensing means transmits a control signal to the thyristor switch 34 to control the speed of the motor 20 and thus the speed of the positive discharge device 16. If the level in the inflow hooper 15 should vary, said level variation is thus sensed by the level sensing means 29. Should the level sink and should thus the control voltage applied by the level sensing means to the thyristor switch 34 sink, the speed of the motor 20 is reduced so that the conveyer screw 18 of the positive discharge device will no longer discharge the same amount of material to the supply 39 located below the discharge pipe 10. The result is that the level of the material in the inflow hopper 15 again rises. Should, on the other hand, the level of the material in the inflow hopper rise unusually much and approach the upper maximum limit at the level 41, the level sensing means will through its transmitter 32 transmit a higher voltage to the thyristor switch, the speed of the motor 20 being increased so that the positive discharge device will carry away the material more rapidly from the telescoping discharge pipe 10 so that the level of the material in the inflow hopper 15 again sinks to the mean level 40. It is thus obvious that a variation of the amount of material 39 supplied per unit of time from the conveyer belt 37 can be compensated for, in that these variations are reflected by level variations in the inflow hopper 15, the level sensing means 29 controlling the conveyer screw 18 in such a manner that said screw tends to keep the level at the desired mean level 40.

As the material is positively discharged from the discharge pipe 10 also in the embodiment according to FIG. 4, the positive discharge device 16 will constantly rest on and exert pressure against the top of the supply 39. In principle, the positive discharge device could of its own accord "climb" the ever increasing supply 39 but in so doing the positive discharge device would have to take up an ever larger load because the different discharge pipe members 11-13 will successively rest on the transverse beam or spider 22 in the interior of the positive discharge device. By the pressure in the outlet cone 17 being sensed and the hoist motor 25 or 25' being caused to raise the discharge device 16 the pressure of the discharge device on the supply 39 can be kept also in this case reasonably constant, the particulate material being forced out below the surface level of the supply 39 so that the material already in the supply will serve as a "dust trap."

Figure 1:
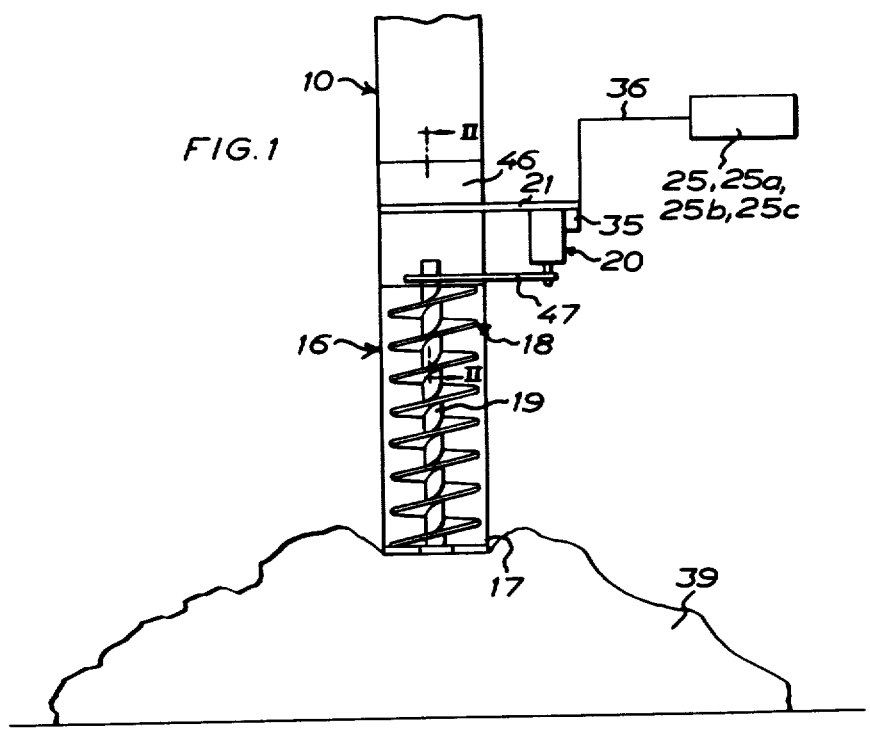

In the described embodiments of the invention the successive elevation or altered position of the positive discharge device 16 is controlled with the aid of the pressure sensing means 35' or 35 which either is disposed in the outlet cone 17' (FIG. 4) or is a sensing means for sensing the load on the motor of the positive discharge device 16 (FIG. 1). Said pressure sensing means thus senses the pressure in the outlet end 17 or 17' and when said pressure rises over a given set maximum value the pressure sensing means 35 or 35' transmits a starting signal to the motor 25, 25a, 25b, 25c, of the positioning device, said motor being started and the mouth of the positive discharge device 16 being caused to change position. In the embodiment shown in FIG. 4 the motor 25' of the hoist means is thus started and the wire rope 23 is wound onto the wire rope drum 24. The winding of the wire rope 23 onto the drum 24 will result in the positive discharge device 16 being raised somewhat until the pressure sensing means 35' senses a predetermined permissible minimum pressure, the pressure sensing means 35' transmitting a stop signal to the motor 25', whereby the raising of the positive discharge device 16 is arrested. Similarly, a control of the position of the outlet end 17 vertically or laterally takes place when the positive discharge device is arranged at the lower end of the rigid pipe 10 of non-variable length, although the discharge pipe is designed for raising and lowering and possibly also for lateral displacement in conformity with what is shown in FIG. 3.

It will thus be realized that the unloading apparatus according to the invention provides a pressurized continuous discharge of the particulate material, the actual dust formation having been restricted to the area about the inflow end of the discharge pipe 10, that is, to the area about the discharge end of the conveyer belt 37 above the inflow hopper 15 in FIG. 4 and to the loading station of the feed conveyer 51 (which preferably is a screw conveyer) in FIG. 3. However, this portion of the unloading apparatus can readily be encapsulated in a dust proof manner. No dust formation arises at the outlet end of the positive discharge device 16, since said device is constantly caused to discharge the particulate material below the surface of the supply 39. Besides, if care is taken—as contemplated in the embodiment shown in FIG. 4—that the particles 38 are not allowed in normal operation of the apparatus to fall freely through the discharge pipe 10, a further reduction of the dust formation is attained.

The system, of course, includes bypass connections so that the positive discharge device 16 can be caused entirely to empty the discharge pipe 10. A prerequisite therefor is that the level sensing means 29 is bypassed since said means will otherwise stop the motor 20 when the level of the material in the discharge pipe 10 falls below the set minimum level 40. Moreover, the apparatus of course contains such bypass connections that the motor 25 or 25' can be driven independently of the pressure sensed by the pressure sensing means 35 or 35' as otherwise an entirely empty unloading apparatus could not be raised from the supply 39 when this is needed. Further, the apparatus preferably contains means which shut off the feed devices upstream of the discharge pipe, particularly the conveyer belt 38 when the maximum level permissible in the inflow hopper 15 is exceeded so that overflowing of the inflow hopper 15 is avoided. A level sensing means can also be exploited in the embodiment of the invention where the discharge pipe 10 is of constant length. Thus, a level sensing means can be arranged in the area of the transition housing 50 in FIG. 3, and said level sensing means may be designed in the same manner as the level sensing means 29 in the embodiment according to FIG. 4. The level sensing means can serve as an overfill protection means and shut down feed devices upstream of the discharge pipe 10, particularly the feed conveyer 51 so that overfilling of the discharge pipe 10 and the transition housing 50 is avoided. As a safety measure the unloading apparatus suitably also has a safety circuit which prevents a downward movement of the outlet end 17 when the motor of the positive discharge device is at standstill.

In the embodiments illustrated the positive discharge device 16 is designed as a screw conveyer having a stationary tubular shell but the positive discharge device can also be designed in accordance with the disclosures of Swedish Pat. No. 352 600 which relates to a screw conveyer in which both the screw proper and the tubular shell rotate, but in opposite directions.

FIG. 4 very schematically shows the transmission of power from the motor 20 to the shaft 19 of the conveyer screw. Purely technically, the problem of power transmission can be solved in the same manner as in FIG. 2, in which the upper part of the tubular shell of the positive discharge device has been designed as a breeches pipe, the shaft 19 of the conveyer screw extending through the breeches pipe walls and carrying in the free space 45 between the breeches a belt pulley 47 which is connected by means of a drive belt to a pulley mounted on the shaft of the motor 20. Another possibility of solving this problem of power transmission is to mount the drive motor 20 at the lower end of the conveyer screw shaft 19 in the outlet cone 17, in which case the drive motor 20 and the lower bearing of the shaft 19 are protected in a suitable way, for instance by a conical partition, from getting in contact with the material discharged through the discharge device. A third possibility of arranging the transmission of power from the motor of the positive discharge device to the conveyer screw shaft 19 is shown in FIG. 6. In this embodiment the lower end of the discharge pipe 10 has a slanting pipe length 60, which opens into the side of the upper end of the positive discharge device 16 so that it has been possible to mount the motor 20 beside the discharge pipe 10 for direct connection to the shaft 19 on the conveyer screw. This embodiment of the power transmission between the motor 20 and the conveyer screw shaft 19 can be exploited in all of the foregoing embodiments of the unloading apparatus. If use should be made of the arrangement shown in FIG. 6 for a telescoping discharge pipe 10 a fixation 61 for the hoist wire rope 23 can be provided on the slanting pipe length 60 so that the hoist wire rope need not extend through the interior of the discharge pipe 10 and be exposed to the wearing effect of the discharged particulate material. Also in the embodiment according to FIG. 4 the hoist wire rope 23 can thus be placed outside the discharge pipe 10, and naturally nothing prevents utilizing more than one hoist wire rope.

What is claimed is:

1. An apparatus for unloading loose particulate solid material by positive discharge into a pile in a manner to diminish dust formation problems comprising
   a substantially vertically directed discharge pipe having an outlet end,
   a positioning means for varying the position of said outlet according to pressure in said discharge pipe in the vertical or lateral senses, including a drive motor for raising, lowering or laterally displacing said outlet end,
   a positive discharge means arranged at said outlet end of said discharge pipe for forcing the discharge of the material through said outlet end under pressure into the pile and having a motor connected for driving said positive discharge means,
   and a pressure sensing means to sense the pressure of the material at said outlet end and to regulate said drive motor of said positioning means in dependence on said pressure.

2. An apparatus as claimed in claim 1, wherein the positive discharge means is a screw conveyer.

3. An apparatus as claimed in claim 1, wherein a level sensing means is disposed in the inflow end of the discharge pipe for sensing the level of the material therein and is connected to a control circuit for controlling the level of the material in the discharge pipe.

4. An apparatus as claimed in claim 3, wherein the control circuit is connected to a feed device serving to supply the particulate material to the inflow end of the discharge pipe to control the feed rate of said device in dependence on the level of the material in the inflow end of the discharge pipe.

5. An apparatus as claimed in claim 3, wherein the control circuit is connected to the drive motor of the positive discharge means for controlling the speed thereof in dependence on the level of the material in the inflow end of the discharge pipe.

6. An apparatus as claimed in claim 1, wherein the pressure sensing means is disposed in the vicinity of the outlet end.

7. An apparatus as claimed in claim 3, wherein the motor of the positive discharge means is a DC-motor and the control circuit for said motor includes a thyristor rectifier controlled by the level sensing means.

8. An apparatus as claimed in claim 1, in which the length of the discharge pipe between the inlet and outlet ends thereof is variable, wherein the positioning means is a hoist.

9. An apparatus as claimed in claim 1, wherein the discharge pipe and a feed conveyer serving to supply the particulate material to the inflow end of the discharge pipe are pivotally interconnected in the form of the raisable and lowerable system similar to a crane arm.

10. An apparatus for unloading loose particulate solid material by positive discharge into a pile in a manner to diminish dust formation problems comprising
   a substantially vertically directed discharge pipe having an outlet end,
   a positioning means for varying the position of said outlet in the vertical or lateral senses, including a drive motor for raising, lowering or laterally displacing said outlet end,
   a positive discharge means arranged at said outlet end of said discharge pipe for forcing the discharge of the material through said outlet end under pressure into the pile and having a motor connected for driving said positive discharge means,
   and means to sense the pressure of the material at said outlet end by sensing the load on said motor of said positive discharge means and to regulate said drive motor of said positioning means in dependence on the load sensed.

* * * * *